United States Patent [19]

Lloyd et al.

[11] 4,131,919
[45] Dec. 26, 1978

[54] ELECTRONIC STILL CAMERA

[75] Inventors: Gareth A. Lloyd; Steven J. Sasson, both of Rochester, N.Y.

[73] Assignee: Eastman Kodak Company, Rochester, N.Y.

[21] Appl. No.: 798,956

[22] Filed: May 20, 1977

[51] Int. Cl.² .................................................. H04N 5/79
[52] U.S. Cl. ........................................ 360/9; 360/35; 358/127; 358/134; 358/213
[58] Field of Search ........................ 360/9, 10, 8, 35, 33; 179/2 TV; 358/127, 134, 213, 85, 133, 78

[56] References Cited

U.S. PATENT DOCUMENTS

| | | | |
|---|---|---|---|
| 3,858,232 | 12/1974 | Boyle | 357/24 |
| 3,911,467 | 10/1975 | Levine | 358/213 |
| 3,962,725 | 6/1976 | Lemke | 360/37 |
| 4,016,361 | 4/1977 | Pandey | 360/9 |
| 4,057,830 | 11/1977 | Adcock | 360/35 |

Primary Examiner—Bernard Konick
Assistant Examiner—Alan Faber
Attorney, Agent, or Firm—D. P. Monteith

[57] ABSTRACT

Electronic imaging apparatus, preferably an electronic still camera, employs an inexpensive information-recording medium such as audio-grade magnetic tape for "capturing" scene images. The camera includes a charge coupled device comprised of an array of photosensitive elements which form a charge pattern corresponding to an optical image projected onto the elements during an exposure interval. A charge transfer circuit converts the charge pattern into a high frequency pulsed electrical signal immediately following the exposure interval to remove the charge from the device in a short period of time to maintain unwanted "dark current" at a low level. Each pulse represents the image-forming light projected onto a particular photosensitive element. A high speed analog-to-digital converter converts these pulses to multi-bit digital words in real time. A digital buffer memory temporarily stores these words, then retransmits them at a rate that is compatible for recording on the audio-grade tape. The image can be displayed on a conventional television receiver by reading the recorded words from the tape and converting them to a format compatible with the signal-receiving circuitry of the television.

8 Claims, 4 Drawing Figures

PRIOR ART

FIG.2

ELECTRONIC STILL CAMERA

BACKGROUND OF THE INVENTION

Field of the Invention

This invention relates in general to electronic imaging apparatus and in particular, to an electronic still camera that employs a non-volatile reuseable storage medium for recording scene images.

Description of the Prior Art

Conventional cameras employ a shutter for exposing for a limited duration photographic film located at a film exposure plane. Film processing solutions are required to produce a visible image of trhe photographed scene. As is well known, processed photographic film may not be reused.

Recently, considerable effort has been given to the development of solid-state elements for imaging purposes. Such elements offer an advantage over photographic film in that, theoretically, they can be reused any number of times for imaging.

A solid-state imaging element of the type known as a charge transfer device can include a semiconductive substrate doped with majority carriers and covered with a thin insulating film upon which is located an array of electrically conductive electrodes. A depletion region or potential well is formed within the semiconductor under electrodes biased by a voltage of the proper polarity. The use of a charge transfer device involves the basic concept of forming a charge pattern consisting of packets of minority carriers in the potential wells. In the course of an optical imaging process, photons incident upon the semiconductor generate minority carriers within these potential wells in proportion to the amount of light impinging upon the semiconductor in the near vicinity of each well. These packets can be transferred through the semiconductor by sequentially biasing the electrodes. The potential wells effectively "move" through the semiconductor sweeping the minority carriers along within the wells. At an appropriate location these packets may be detected, for example, by removing them sequentially from the semiconductor by means of a reverse-biased diode coupled to transfer electrodes. An arrangement for read-out of information from a charge transfer device is disclosed in *IEEE Transactions On Electron Devices*, Vol. ED-20, No. 6, June 1973, in an article entitled "Interlacing In Charge Coupled Imaging Devices", by Carlo H. Sequin.

As with conventional photographic film, to obtain a scene image having a proper contrast, the imaging element must not be overexposed, or, in other words, the potential wells must not be saturated with minority carriers during the exposure interval. However, even in the absence of illumination, the regions constituting the potential wells tend to saturate with the passage of time by means of the thermal generation of minority carriers. Carriers generated in this manner constitute an unwanted signal commonly known as a "dark current". It is important that this signal be only a small fraction of the signal produced by incident illumination, particularly if the dark current is non-uniform over the imaging area.

U.K. Pat. No. 1,440,792, entitled ELECTRONIC STILL PICTURE CAMERA, and U.S. Pat. No. 4,057,830 which corresponds thereto and is entitled Electronic Photography System, disclose a camera for electronically recording "stop-action" or still pictures that includes a charge transfer device, and recording apparatus that employs an inexpensive information-recording medium which is non-volatile and reuseable, such as a magnetic tape, disc or drum. The camera also includes a conventional shutter mechanism for exposing the transfer device to reflected scene light for a duration related to scene brightness. The rate of read-out of the signals produced by the charge transfer device is synchronized with the speed of the recording apparatus since the transfer device output is connected directly to the input of the recording apparatus. These signals are read-out at a relatively slow speed to record a scene image on the storage medium that is employed. It takes approximately one second to output scene information from the charge transfer device. For "stop-action" photography an exposure interval of approximately 1/20 second or less is needed. Accordingly, the charge transfer device is used both for imaging and until scene information is read-out, for data storage.

That camera suffers from the disadvantage that the charge pattern related to the incident illumination will be adversely affected by thermally generated minority carriers. Not only would it be expected that significant dark current would be produced with a 1-second storage interval, but it could also be expected that the "dark current" would be nonuniform. This is because the storage interval for any potential well, and accordingly the number of thermally generated minority carriers in that well, is dependent upon whether or not that potential well is among the first or the last to sweep through the semiconductor to an output transfer electrode. Furthermore, saturation of some potential wells may occur if too many minority carriers are thermally generated. Excess minority carriers would spread to adjacent potential wells to be added to minority carriers in non-saturated potential wells.

SUMMARY OF THE INVENTION

An object of the present invention is to provide improved electronic imaging apparatus.

In accordance with the above object, the present invention is addressed to an electronic still camera which includes a solid-state imaging device that produces a charge pattern corresponding to an optical image projected onto an imaging surface during an exposure interval. Charge transfer means converts such charge pattern into a high frequency pulsed electrical signal within a relatively brief time after termination of the exposure interval. Electrical signal transforming means receives data corresponding to this electrical signal in real time, then retransmits such data at a substantially slower rate to recording apparatus. This slower data rate permits recording of signals corresponding to the optical image on an inexpensive recording medium such as audiograde magnetic tape.

The invention, and its objects and advantages, will become more apparent in the detailed description of a preferred embodiment presented below.

BRIEF DESCRIPTION OF THE DRAWINGS

In the detailed description of a preferred embodiment of the invention presented below, reference is made to the accompanying drawings in which.

DESCRIPTION OF A PREFERRED EMBODIMENT

The present description will be directed in particular to elements forming part of, or cooperating more directly with, apparatus in accordance with the present invention. It is to be understood elements not specifically shown or described may take various forms well known to those having skill in the art.

Figures 1, 3:
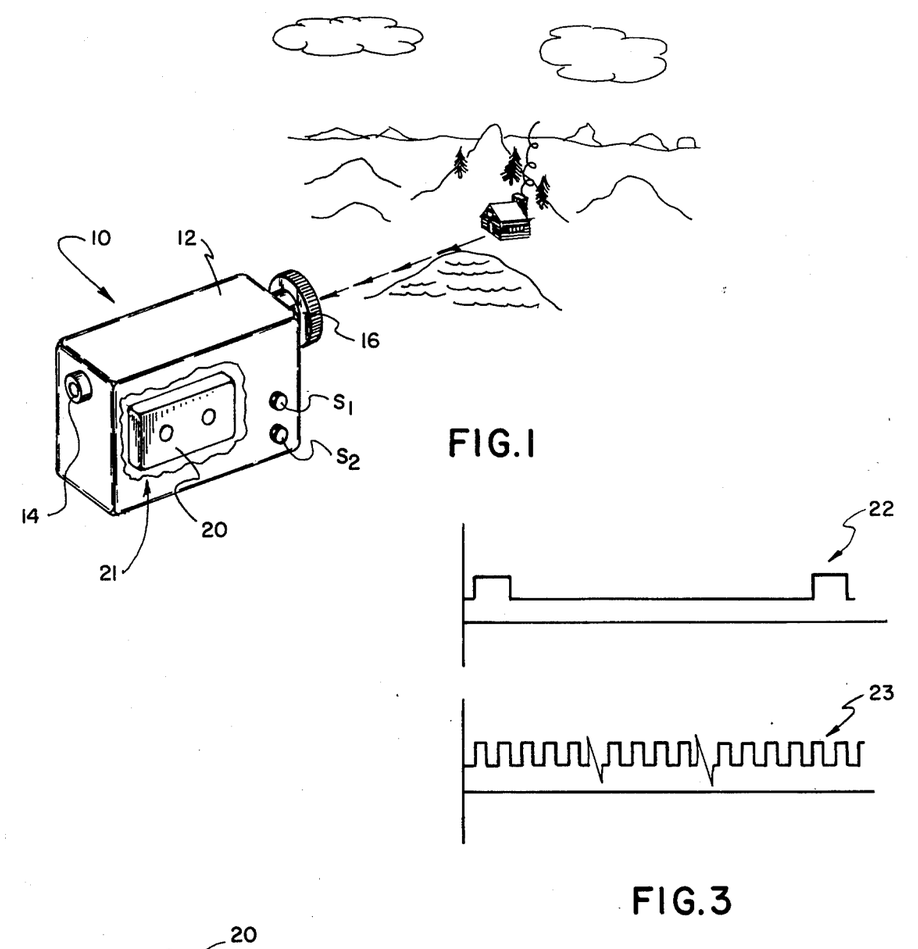
FIG. 1 pictorially represents an electronic still camera in accordance with the teachings of the present invention.
FIG. 3 is a drawing of waveforms to help explain the operation of the solid-state image sensor and signal processing circuitry of FIG. 2.

There is shown in FIG. 1 of the drawings an electronic still camera, designated generally by the numeral 10. As with conventional still cameras of the type that employ photographic film for "capturing" light from a scene being photographed, camera 10 includes a housing 12, a viewfinder 14, and a taking lens 15 (shown in FIG. 2) located within a lens barrel 16. A diaphragm mechanism 17 (shown in FIG. 2), coupled to an exposure control circuit 18 (also shown in FIG. 2), forms a variable aperture aligned with lens 15 to control the amount of scene light transmitted through the lens. Diaphragm control is automatic and is provided by means, well known in the art, that controls the lens aperture in accordance with the intensity of reflected scene light, the control being effected by the current produced by a photoconductive element, such as a photocell, of circuit 18. Photoconductively controlled diaphragm mechanisms are well known in the art and are disclosed in several patents, one of which is U.S. Pat. No. 3,962,707 filed in the name of F. M. Galbraith, Jr. and commonly assigned herewith.

Unlike conventional still cameras that employ photographic film, camera 10 employs a solid-state image sensor 19 (shown in FIG. 2), located at the focal plane of lens 15, and a record storage medium, such as, for example, reuseable magnetic tape, for recording electrical signals corresponding to scene images projected onto the imaging surface of sensor 19. The tape may, for example, be located in a magnetic tape cassette 20, which is located in a cassette-receiving chamber 21. Chamber 21 is accessible through a camera door (not shown) and includes means (also not shown) for removably mounting the cassette 20 in the chamber. Cassette 20 is adapted to be connected to suitable data retrieval apparatus, as referred to hereinafter, to obtain visual displays of recorded scenes.

Sensor 19 constitutes a charge transfer device and, in particular, is a charge coupled device (CCD), which produces a pattern of charge carriers that is an analog representation of an optical image focused onto an imaging surface of the CCD. As is known in the art, a CCD may include a silicon substrate covered by oxidized silicon, with an array of closely spaced conducting pads on the silicon dioxide surface. The pads serve as gate electrodes and may, for example, be formed by selectively doping a layer of transparent polysilicon material. These gate electrodes are interconnected in rows (or columns), which are electrically connected to both a CCD address circuit for sequentially applying gate electrode voltages, and to a data readout register.

When a CCD is used as an imaging device, charge carriers are produced by light quanta absorbed in the silicon, the number of carriers being proportional to the amount of radiant energy reaching the silicon. During the so-called "integration time", comparable to the exposure time in conventional camera art, the CCD address circuit applies voltages to the gate electrode array to provide a pattern of photosites having potential wells which attract charged minority carriers. A charge pattern will form in the potential wells under the various photosites nearest to where the charges are produced. The number of charge carriers which accumulate in each potential well during the integration time is proportional to the amount of radiant energy reaching that well and this, in turn, is proportional to the radiation intensity and the duration of the integration time. Thus, a spatial pattern of carriers corresponding to an optical image is produced by the CCD. For further, more detailed descriptions of CCD's, reference is made to one of the numerous publications on such devices, U.S. Pat. No. 3,858,232, entitled INFORMATION STORAGE DEVICES, the disclosure of which is incorporated herein by reference.

By the proper manipulation of voltage potentials to the interconnected rows (or columns) of electrodes following this integration time, this charge pattern can be shifted to one point of the CCD, where, by means of a suitable output connection the charge collected can be removed sequentially into the aforementioned data readout register. This stream of charge then constitutes an electrical current which is an analog replica of the light projected onto the CCD. Such a current is caused to flow through an output load to generate a train of voltage pulses, each pulse representing one small area of the projected image with pulse amplitude being proportional to the amount of radiation reaching a particular photosite.

With our presently preferred CCD apparatus, an image is formed in two separate, interlaced fields, each field containing one-half the total number of photosites. Photosites are formed in the first field for 25 milliseconds (ms), then photosites are formed in the second field for the next 25ms interval, the total "exposure interval" being 50ms. While charge packets are formed in the second field, the charge pattern in the first field is read out and converted to a train of voltage pulses, the pulse repetition rate being inversely proportional to the interval used for read-out. For detailed descriptions of CCD interlacing techniques and apparatus, reference is made to U.S. Pat. No. 3,911,467, entitled INTERLACED READOUT OF CHARGE STORED IN CHARGE-COUPLED IMAGE SENSING ARRAY, and to the aforementioned article by C. H. Sequin.

Since the fields are interlaced, scene information is reorganized so as not to be presented for display in the same interlaced timing format. Apparatus for data reorganization is provided by the aforementioned data retrieval apparatus.

A type 201 CCD, manufactured by the Fairchild Camera and Instrument Company (FCI), includes a 100 × 100 photosite array. For that CCD, an optical image may be represented by a CCD output pulse train of 10-thousand pulses. Four pulses of such a train are denoted A in FIG. 2.

Two of the clock signals associated with CCD 19 are illustrated schematically in FIG. 3. Waveform 22 constitutes a master clock signal and is used to signal the beginning and end of a pulse train that represents an image projected onto the CCD during one "exposure interval", e.g. 50ms. For a pulse train duration of, for example, 50ms, waveform 22 would be a 20 cycle per second (Hz) signal. (The duration of such a pulse train and an exposure interval need not be the same.) Waveform 23 is a high-frequency signal that is used to synchronize the operation of signal processing circuitry, denoted generally 24, with the occurrence of each pulse in the CCD output signal, as explained in detail hereinafter. If 10,000 pulses are produced in a 50ms interval, waveform 23 would be a 200-thousand Hz signal.

In accordance with our invention, light from a scene to be recorded is "captured" electronically in the following manner. A camera operator first actuates a power control member to apply electrical power to circuitry 24. At that instant, CCD address circuits cause the CCD to commence producing its pulsed output signals, a pulse train being produced for each exposure interval. In addition, light-sensitive exposure control circuit 18 positions diaphragm 17 to form a lens aperture in accordance with the level of ambient light. No CCD output pulse train is processed, however, until a second control member is actuated. Once such actuation occurs, a CCD output signal, representing an optical image projected onto an imaging surface during one exposure interval, is processed. Each CCD pulse for the interval is digitized in real time to form a digital word, i.e., a total of 10,000 digital words for the aforementioned type 201 CCD, and such words are advantageously stored in a high-speed buffer memory. These digital words are sequentially retransmitted, preferably, after the buffer memory receives the last digital word, at a rate that is substantially lower than the CCD pulse output rate. This low signal rate permits inexpensive recording apparatus to be used for recording scene information.

With our presently preferred camera apparatus, the scene information for the first field is stored in the buffer memory during the time the charge pattern for the second field is formed. Accordingly, the total time used to "capture" a single scene image and store it in the buffer memory is approximately 75ms. Scene information is transferred from the buffer to the recording apparatus in approximately 23 seconds.

With this arrangement, CCD dark current is maintained at a low level since the CCD is not employed for information storage in the same sense as is the imaging device employed in the electronic camera disclosed in the aforementioned U.K. patent 1,440,792. Furthermore, there is no need to employ expensive recording apparatus, such as broadband video apparatus. In fact, recording apparatus having relatively slow recording or data-write speeds, such as for example, audio-grade magnetic recording apparatus, may be utilized to reliably and accurately record information transmitted from the buffer memory.

It shall be understood that an "integration interval" and the time used to output scene data from the CCD for one field need not be predetermined nor of the same duration. For example, an integration interval and/or exposure interval could be controlled by a light-sensitive integrating circuit, the control being effected by the time required to charge a capacitor to a predetermined level by a current through a photoresistive element. The capacitor and photoresistor constitute an integrating circuit having a variable time constant related to the intensity of the light impinging on the photoresistor. Read-out of scene data from the CCD could, for example, commence in timed relation to the capacitor being charged to such level Photoconductively controlled timing circuits are well known in the art and are disclosed in many patents, one of which is U.S. Pat. No. 3,672,267, entitled SEQUENTIAL CONTROL FOR CAMERA DIAPHRAGM AND SHUTTER, and commonly assigned herewith.

An important feature of our invention is, however, that read-out of the charge pattern for each field occurs rapidly so that the CCD is not employed for any significant period of time as a storage device.

Figure 2:
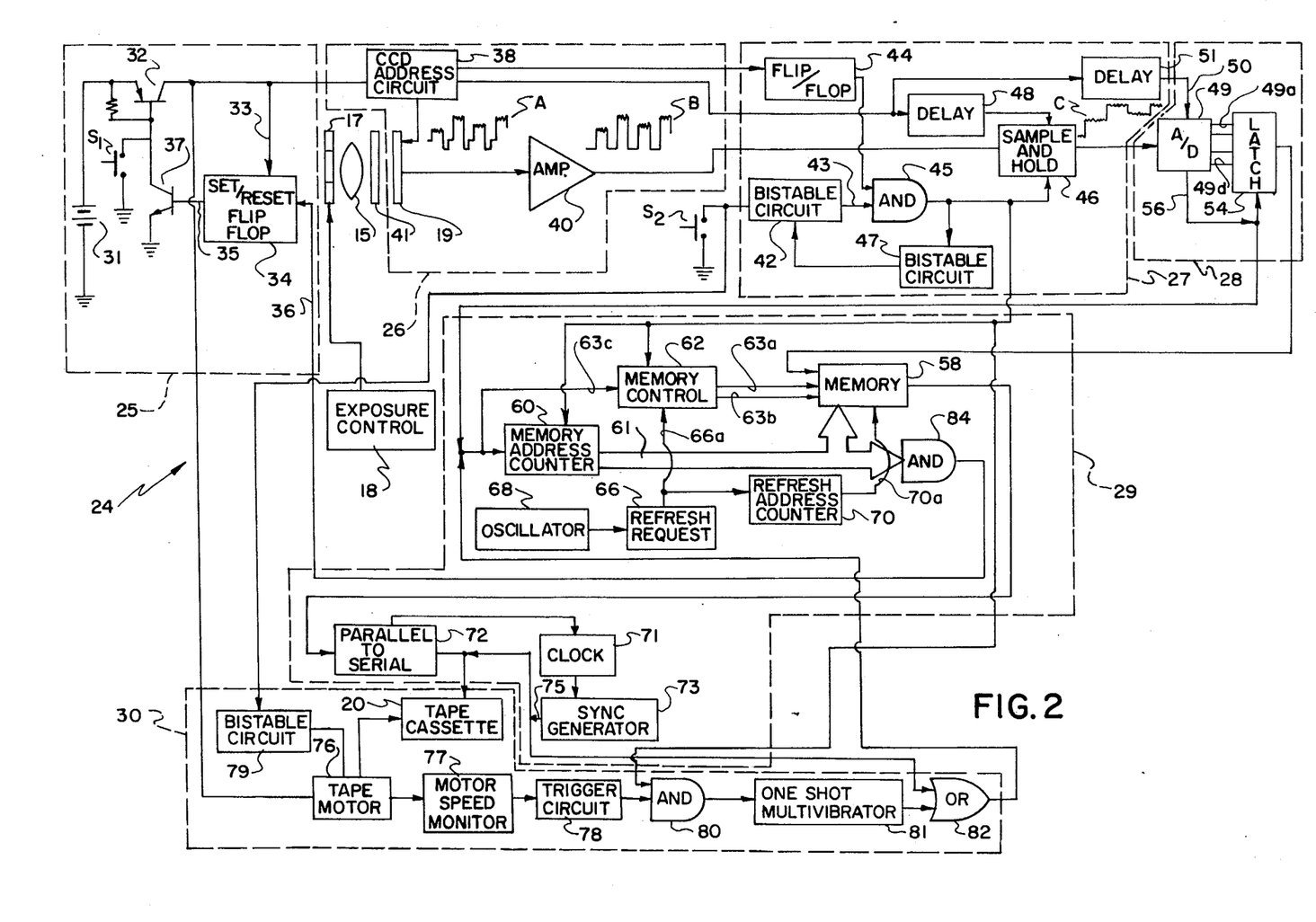
FIG. 2 is a schematic block diagram of a solid-state image sensor, and signal processing circuitry in the camera of FIG. 1.

Referring now to FIG. 2, there is shown a schematic diagram of signal processing circuitry 24 for obtaining still pictures of scenes imaged onto CCD 19. Circuit 24 includes generally a power control circuit 25, and image-sensor apparatus 26, including CCD 19, for producing a high frequency pulsed electrical signal corresponding to an imaged scene, each pulse in the signal having an amplitude proportional to the amount of light impinging on a particular photosite of the CCD. A circuit 27 constitutes an electronic shutter to control the signal produced by CCD 19 that is to be recorded. An analog-to-digital (A/D) converter circuit 28 converts in real time the signal transmitted by circuit 27 into multi-bit digital words. Buffer circuitry 29 functions to receive and temporarily store such words in real time, then transmits them at a rate that is substantially lower than the real time rate at which these words are loaded into the buffer. Circuit 24 also includes recording apparatus 30 having a data recording speed that is compatible with the rate that data is transmitted from buffer 29.

As with a conventional still camera that employs photographic film to obtain a "photograph" lens barrel 16 (FIG. 1) is pointed at a scene visible through viewfinder 14. Electrical power is provided for circuitry 24 from a battery 31 upon actuation of a momentary, pushbutton switch $S_1$ mounted on housing 12, as shown in FIG. 1. When switch $S_1$ is closed, the baseemitter junction of transistor 32 is forwardly biased to turn the transistor ON, and collector current flows to turn signal processing circuitry 24 ON. At the same time, a bias signal is produced on conductor 33 that is applied to a set-reset flip flop 34. When this happens, flip flop 34 assumes a set condition and produces at its output 35 a high-level voltage to thereby turn transistor 37 ON. When a voltage signal above a predetermined level is applied to its input 36, flip flop 34 switches into its reset condition and its output 35 produces a low-level voltage to turn transistor 37 OFF. When this occurs, with switch $S_1$ in its open position, transistor 32 is turned OFF to remove electrical power from circuitry 24.

Image-sensor apparatus 26 includes a CCD address circuit 38, which causes signals 22 and 23 in the form of clock pulses to be applied to CCD gate electrodes in a known manner to produce the aforementioned pulsed electrical output signal. This output signal is produced during a brief interval immediately following the integration time for each of the aforementioned two fields so that dark current is maintained at a low level. In a preferred embodiment, FCI type 201 CCD is employed using a 25ms integration time and 25ms readout interval for each field, the total readout interval being 50ms for the signal representing an optical image.

Image-sensor apparatus 26 also includes a video amplifier 40 to filter out noise in the CCD output signal, as illustrated diagrammatically by the signal waveform B at the output of amplifier 40. Since CCD's typically are sensitive to infrared (IR) radiation, image-sensor apparatus 26 may further include an IR filter 41 interposed along the optical axis of camera 10 between lens 15 and CCD 19. Filter 41 blocks IR radiation so the charge pattern produced by CCD 19 is more closely related to impinging radiation in the visible spectrum. Factors affecting CCD performance are discussed in *IEEE Transactions On Electron Devices*, Vol. ED-18, No. 11, November 1971, page 986, entitled "Charge-Coupled Imaging Devices: Design Considerations", by G. F. Amelio et al.

As soon as electrical power is applied to circuit 24, CCD 19 immediately begins to produce its pulsed electrical output signals. For successive 50ms exposure intervals families of pulse trains are generated with each pulse train representing the optical image formed during one such interval. Until momentary, pushbutton switch $S_2$, mounted on camera 10, is depressed, however, circuit 27 is effectively disabled, and image data is not transmitted to apparatus 30 for recording. Circuit 27, in effect, operates as an electronic shutter or gate. However, unlike a conventional camera shutter which operates to control the time during which light is allowed to reach a light-sensitive medium, i.e. film, this electronic shutter controls the signal, representing an optical image, that is to be recorded. The reason circuit 27 is effectively disabled immediately after power is applied to circuitry 24 is to permit CCD 19 to clear itself of thermal charge prior to recording an image signal. With out presently preferred CCD apparatus, we have found that approximately one-half second is needed to clear the CCD of such charge after power is applied.

Circuit 27 operates as follows: Momentary closure of switch $S_2$ causes a bistable circuit 42 to produce a logic "1" signal at its output 43. A flip flop 44 produces both logic "1" and "0" signals at its output following the occurrence of odd numbered and even numbered pulses, respectively, in the aforementioned 20Hz signal 22. Accordingly, an AND gate 45, which conducts in response to logic "1" signals at each of its inputs, produces a logic "1" output signal following the occurrence of the first odd numbered pulse in signal 22, after switch $S_2$ is actuated. The logic "1" signal turns ON a conventional sample-and-hold circuit 46. Circuit 46 serves to extend the duration of each pulse in waveform B for the period between the trailing edge of one pulse and the leading edge of the next pulse. Accordingly, sample-and-hold circuit 46 produces an electrical signal having a series of contiguous pulses. Such a signal is denoted by the letter C in FIG. 2. When the output signal produced by gate 45 returns to a logic "0" state, such as when the next pulse (an even numbered pulse) in signal 22 is applied to flip flop 44, circuit 46 is turned OFF. At that time, however, 50ms have passed and an electrical signal representative of a full scene image has been transmitted through sample-and-hold circuit 46.

When the output of gate 45 is a logic "0", a logic "1" signal occurs at the output of a bistable circuit 47. This logic "1" operates to reset circuit 42 so that its output returns to its normal, logic "0" state. This is done to prevent the output of gate 45 re-enabling circuit 46 upon the occurrence of the next odd numbered pulse in waveform 22, without the reactuation of switch $S_2$.

The aforementioned high frequency signal 23 from CCD address circuit 38 is used to synchronize the operation of sample-and-hold circuit 46 with waveform B. A delay circuit 48 delays signal 23 to allow for CCD readout and signal delay through amplifier 40. Signal 23 is delayed by circuit 48 to synchronize the operation of sample-and-hold circuit 46 with the occurrence of each pulse in waveform B so that pulses are extended at the proper point in time and with the correct amplitude.

Waveform C is applied to A/D converter 28 which converts each extended pulse into a 4-bit digital word having a magnitude representative of pulse amplitude. Converter 49 produces these bits sequentially, the most significant bit is produced first on output 49a, and the least significant bit is produced last on output 49d. A start-conversion signal is supplied on conductor 50 to permit converter 49 to commence each signal conversion operation in synchronism with the occurrence of each waveform C pulse. This is done by means of signal 23 which is delayed a predetermined amount by a delay circuit 51.

A digital latch 54 is provided to ensure that the bits representing each digital word are not changing during signal transmittal to buffer circuitry 29. A/D converter 28 produces an end-of-conversion (EOC) signal on conductor 56 once each least significant bit is produced, to signal latch 54 to transmit a digital word to buffer 29.

Buffer circuitry 29 constitutes means for receiving signals in the form of digital words from A/D converter 28 in real time, and transmitting such words at a rate that is substantially lower than the rate at which these words are received from the A/D converter. Since digital words representing a single optical image are loaded into memory 58 within 50ms, while approximately 23 seconds are used to transmit such words from the memory to recording apparatus 30, buffer 29 operates to reduce by a factor of approximately 460 the rate that digital words are transmitted to apparatus 30 from the buffer compared to the rate such words are transmitted from the CCD into the buffer. To accomplish this, the buffer 29 includes a highspeed digital memory 58 for temporarily storing words as they are accumulated prior to transmittal from the buffer to recording apparatus 30. Preferably, buffer 29 is operated to transmit stored words after memory 58 has received the last word. This is done to simplify the operation of buffer 29 and does not operate to significantly increase the time between when the signal is produced by CCD 19 and when such signal is recorded by apparatus 30 since all words are loaded into memory 58 within 75ms after an exposure interval commences. It shall be understood, however, that it is within the spirit and scope of our invention that signal transferral from memory 58 can commence as soon as the first digital word is loaded into memory.

Buffer 29 operates as follows: The aforementioned EOC signal produced on conductor 56 is also applied to a memory address counter 60 included within buffer 29. Counter 60 serves a record keeping function for memory 58 by providing an addressenable signal along input address line 61 to control where in memory either write or read operations are to occur. Address counter 60 is initialized to ZERO when AND gate 45 switches its output either from a logic "0" to a logic "1" or from a logic "1" to a logic "0". When an EOC signal is produced, counter 60 increments its count by one to permit the memory location corresponding to that count or address to receive a digital word for storage.

A memory control circiut 62 provides command signals to memory 58 to control whether information is to be written into a read from memory. Control circuit 62 is enabled to produce memory write-control and read-control signals on conductor 63a when the output of gate 45 is a logic "1" and a logic "0", respectively. These write-control and read-control signals turn input write-logic and read-logic gates (not shown) ON in memory 58 to permit data to be written or read, respectively, from memory at the address corresponding to the count provided by counter 60. Such write-control and read-control signals are produced when data-ready signals are provided on input conductor 63c. These data-ready signals occur either when the aforementioned EOC signals are produced, or when recording apparatus 30 produces its output signals, as explained in detail hereinafter.

Memory 58 is comprised of a plurality of solid-state random access memories (RAM's) which are connected together to provide high-speed storage for 10,000 4-bit words within the aforementioned 50ms interval. Solid-state memories have the speed for storing data this quickly. However, as is known in the art, solid-state RAM's may periodically require "rejuvenation" or "refreshing" to maintain data as originally stored. Buffer 29 therefore, includes memory refresh circuitry comprising a refresh-request circuit 66, under the control of an oscillator 68, and a refresh address counter 70. Circuit 66 produces a refresh-request signal on conductor 66a, and counter 70 produces a refresh-address signal on conductor 70a. Each of such signals are produced at 63 microsecond intervals. The refresh-address signal determines which memory locations are to be refreshed. Each refresh-request signal causes memory control 62 to produce a memory refresh signal on conductor 63b to refresh the data at the memory address corresponding to the count provided by counter 70.

The circuitry within memory 58 by which stored information is refreshed, and information is stored and/or written into the memory is readily available commercially. In our preferred embodiment, memory 58 is comprised of dynamic RAM's manufactured by the Motorola Corporation, and designated MCM6605.

An information storage device that requires electrical power to retain or preserve stored information presents obvious advantages, particularly for camera users who wish to store recorded information for long intervals. Accordingly, it is desirable to provide a storage device by which scene information may be permanently stored or recorded without the need for electrical power to preserve the information once it is recorded. A storage device of this type is known in the art as non-volatile. In addition, it is desired that such a storage device be inexpensive. To meet these objectives, buffer memory 29 includes circuitry for outputting stored data at a rate below the 200 KHz rate, e.g. 10,000 words within the 50ms interval, that data is received. The desired data output rate is controlled so that it is compatible with the recording speed of a permanent inexpensive recording apparatus, such as, for example, an audiograde magnetic tape recorder. Such circuitry controls the rate data is read from memory 58 and includes a clock 71, a parallel-to-serial bit converter 72, and sync-pulse generator 73. Generator 73 is controlled by clock 71 and produces at its output 75 both a sync signal to be recorded and a data-ready signal to read stored information from the memory.

Recording apparatus 30 includes, in addition to cassette 20, a tape recorder motor 76, a motor speed monitor circuit 77, a voltage-sensitive trigger circuit 78, and a bistable circuit 79. When switch $S_2$ is closed, bistable circuit 79 produces a logic "1" signal at its output to turn motor 76 ON to drive the tape in cassette 20. Data commences to be read from memory 58 to be recorded on the tape once both tape recorder motor 76 is operating above a predetermined speed, and the last digital word has been stored in buffer 29. Since motor 76 does not reach such speed instantaneously following the actuation of switch $S_2$, motor speed monitoring circuit 77 is provided to produce a voltage signal having an amplitude proportional to motor speed. This voltage signal is applied to the input of voltage-sensitive trigger circuit 78. Circuit 78 is of the type known in the art as a Schmitt trigger circuit that produces a low-level voltage at its output when a voltage is present at its input that is less than a predetermined level. Likewise, when a voltage signal applied to its input exceeds a predetermined threshold, a high-level voltage signal is produced at its output that is applied to one of two inputs to an AND gate 80.

In addition, when AND gate 45 switches its output from a logic "1" to a logic "0", indicative of when a full scene image has been transmitted through circuit 46 and, accordingly, into buffer 29, a high-level signal is applied to the second of the two inputs to AND gate 80. It would be necessary to invert the logic "0" signal at the output of gate 45 if such signal were a low-level signal. This could, of course, be done by means of an inverter circuit (not shown).

AND gate 80 conducts in response to high-level signals at each of its inputs. Accordingly, gate 80 produces an output signal once motor 76 is operating above a predetermned speed, and a full scene image has been loaded into buffer 29.

When AND gate 45 switches its output from a logic "1" to a logic "0", control circuit 62 is enabled to produce the aforementioned read-control signal when a data-ready signal occurs on conductor 63c. In a manner similar to when a write-control signal is produced, circuit 62 produces voltage signals to set input read-logic gates (not shown) to permit data to be read from memory 58.

Recording apparatus 30 begins to record data stored in buffer 29 once AND gate 80 produces its ouput signal. Such signal causes a one-shot multivibrator 81 to produce an output pulse that is applied to OR gate 82. When this occurs, memory address counter 60 is caused to increment its count by 1. In addition, a data-ready signal is applied to control circuit 62 along conductor 63c. This signal causes control circuit 62 to produce a read-control signal which is applied to memory 58 along conductor 63c. When this happens, a 4-bit word is read out of memory 58 in parallel bit form, at the address determined by counter 60, and is applied to parallel-to-serial bit converter 72. Each 4-bit word is converted to a 4-bit word in serial form and transmitted to tape cassette 20 for recording. At the same time, sync-pulse generator 73 produces a sync bit which is added to the 4 serial bits to produce a 5-bit word that is recorded on magnetic tape loaded in cassette 20.

Each sync pulse is also applied to OR gate 82 to initiate a subsequent read-control signal and to increment address counter 60 by one. The preceding data read sequence continues until each of the 10,000 4-bit words are read from memory and recorded on magnetic tape. Once the last word is recorded, OR gate 82 increments counter 60 to 10,001. When this occurs, and AND gate 84 produces a high-level voltage signal that is applied to input 36 of flip flop 34. Accordingly, flip flop 34 produces a low-level voltage at its output 35 and transistor 37 turns OFF, thereby removing electrical power from camera 10. by automatically turning camera 10 OFF, inadvertent power drain from camera battery 31 is prevented.

Additional pictures are recorded by sequentially reactuating buttons S₁, S₂. However, cassette 20 may be removed from camera 10 after any number of scenes have been recorded.

In a presently preferred embodiment tape recorder apparatus 30 records scene information at a data rate of approximately 2,150 bits/second. Since 5 bits are used to represent the scene light sensed at each of 10,000 photosites (4 information bits and 1 sync bit) 50,000 total bits are used to record each picture. Consequently, an electrical signal representative of a single scene is read from memory 58 and is magnetically recorded in approximately the aforementioned 23 seconds. The recording rate of 2,150 bits/second resulted from a recording density of 390 bits/inch on the tape and a maximum tape speed of 5.5 inches/second. There are, of course, other audio-grade recording systems that would utilize tape having an inherently higher recording density and/or a higher tape speed and which would accordingly reduce the time for magnetically recording a scene. In addition, source and/or channel encoding schemes could be employed to more efficiently record information on the tape. With our presently preferred audiograde tape recorder, up to 25 pictures can be recorded on a single cassette tape.

Figure 4:
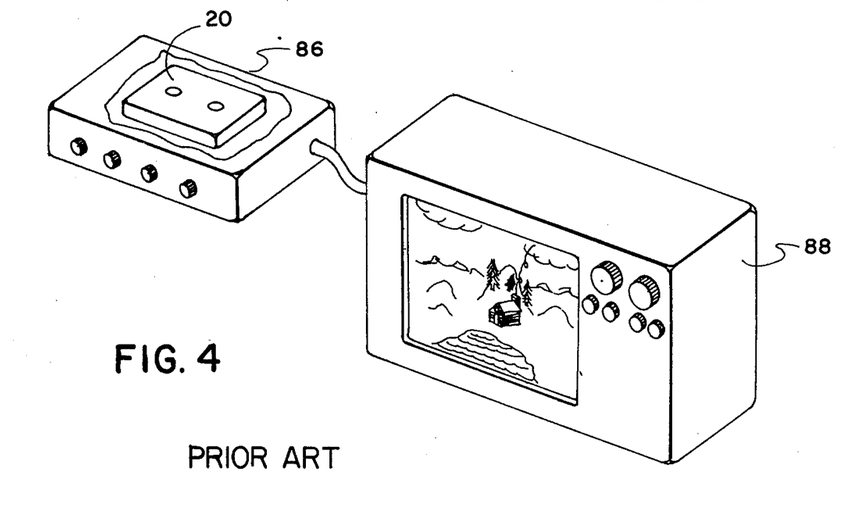
FIG. 4 is a perspective view of apparatus for displaying pictures of scenes recorded by the camera of FIG. 1.

There is shown in FIG. 4 an arrangement by which recorded scene information may be displayed for viewing. Such an arrangement includes a microcomputer 86 of the type manufactured by the Motorola Corporation, and a conventional TV monitor 88. Microcomputer 86 reads scene data from cassette 20 and temporarily stores it in an internal memory (not shown). Microcomputer 86 also reorganizes the data so that it is not presented for display with the same interlaced timing format that data is read out of CCD 19. Digital words are converted to analog form and arranged in a TV-scan format for display on monitor 88. Apparatus, such as microcomputer 86, for converting information data to a format suitable for TV display are well known in the art.

One advantage of the arrangement shown in FIG. 4 is that the camera operator may first visually display each recorded scene, then decide whether to keep the picture. Unwanted scenes may be erased from the tape, and the tape may be reused without incurring additional cost.

Permanent photographic prints may be made on conventional photographic paper. This can be done using electrooptical signal translating apparatus. For example, scene information may be read from magnetic tape and reconverted into a pulsed electrical signal, such as the aforementioned waveform C. Individual pulses in waveform C would then be applied to timing circuitry for controlling the time duration that photographic paper would be exposed. Since each pulse is related to the brightness of a particular point in the recorded scene, the photographic paper may be exposed by a series of variable-duration light signals from a light beam scanned across the paper.

While we have described our invention as employing a magnetic tape for low cost non-volatile information storage, it shall be understood that other non-volatile informationstorage media may be utilized. We prefer to use a non-volatile storage device for user convenience and to reduce power consumption. One other storage medium that appears very attractive for meeting these criteria is a magnetic bubble device. This type of storage device is attractive not only because it is basically non-volatile and requires low power, but offers the further advantage of large storage capacity and may potentially be used to store millions of bits in one device. If this were the case, a magnetic bubble device could replace the magnetic tape recorder.

Although various specific elements and data handling capabilities and characteristics have been used to describe our electronic camera invention, it shall be understood by those skilled in the art that numerous modifications may be made that are within the spirit and scope of our inventive contribution. For example, picture quality could be improved with the use of more bits per photosite to produce improved scene contrast. In an article by A. A. Goldberg, entitled "PCM Encoded MTSC Color Television Subjective Tests", and appearing in *SMPTE*, Vol. 82, No. 8, August 1973, it was reported that no noticeable degradation of picture quality (on an NTSC 525-line, 60-field TV signal) occurred when 6 bits per photosite were used, compared to a picture produced with an undigitized signal.

Furthermore, color pictures are possible using multiple CCD's with appropriate filters or with the development of a single, color responsive CCD. For "capturing" color images, an electrical signal for each of three primary colors could be produced in a manner as set forth hereinbefore. Recorded scene information may be displayed for viewing by transforming each signal into its corresponding color, and forming a composite polychromatic picture. For a detailed description of a solid-state color imaging device, reference is made to U.S. Pat. No. 3,971,065, entitled COLOR IMAGING ARRAY, and assigned to the assignee of the present invention.

Electronic imaging apparatus within the teachings of our invention provides a user the opportunity to take pictures in available light. By utilizing other CCD properties, other advantages can be realized. For example, IR photography is possible with the same camera by simply filtering the light before it reaches the CCD.

In addition, although we have described a preferred embodiment of our invention as constituting an electronic still camera, it shall be understood that the essence of our inventive contribution is also applicable to other electronic imaging apparatus such as, for example, apparatus for recording fast-action scenes such as movie camera apparatus.

We claim:

1. In an electronic still camera having a solidstate light-responsive device for producing at a relatively high rate a stream of discrete signals indicative of optical images received by said device during adjacent exposure intervals, the improvement comprising:
   (a) means for extracting said discrete signals from said light-responsive device during a time interval which is no greater than the interval during which said optical images are produced;
   (b) circuit means for separating said signals from each other;
   (c) means for transforming said separated signals into a stream of signals occurring at a rate which is slower than said high rate; and
   (d) means for recording in real time on a non-volatile medium said slower rate stream of signals.

2. Apparatus as set forth in claim 1 wherein said transforming means comprises storage means for enabling production of said high rate stream of signals and recording of said slower rate stream of signals to occur concurrently.

3. In an electronic still camera having a solid-state light-responsive device located to receive an optical image, said light-responsive device including electrical addressing means for producing families of electrical signals relating to charge patterns formed in said light-responsive device during successive exposure intervals, each signal within a family corresponding to a charge pattern formed during one exposure interval and each of said signals defining a first train of information bearing indices occurring at a first relatively high rate, the improvement comprising:
  (a) control means for providing a signal to said electrical addressing means to extract said families of electrical signals from said lightresponsive device at a speed which is at least as great as the speed at which said charge patterns are formed;
  (b) electrical gating means for effectively isolating at one of said electrical signals from the other of said electrical signals;
  (c) means associated with said gating means for transforming the electrical signal which has been isolated into a second train of information bearing indices occurring at a rate which is substantially less than said first rate of said first train of information bearing indices; and
  (d) means for recording on a medium said second train of information bearing indices.

4. In an electronic still camera having a solid-state imaging device located at an exposure plane, means associated with said imaging device for forming charge patterns relating to optical images projected onto said imaging device during adjacent exposure intervals, the improvement comprising:
  (a) means for producing a stream of discrete electrical signals, representative of said charge patterns, at a speed which is at least as great as the speed at which said charge patterns are formed;
  (b) electrically energizable circuit means for separating a one of said electrical signals from the other of said electrical signals;
  (c) means responsive to said separated electrical signal for producing a plurality of multi-bit words indicative of said separated electrical signal, said digital words being produced in real time;
  (d) data storage means;
  (e) means for transferring said digital words into said data storage means in real time at a first relatively high rate;
  (f) means for retrieving said digital words from said data storage means at a second rate that is substantially lower than said first relatively high rate; and
  (g) recording apparatus for recording said retrieved digital words on a non-volatile recording medium, said recording apparatus having a recording speed that is compatible with said second rate.

5. In an electronic still camera having a light-responsive device located at an exposure plane for producing charge patterns relating to optical images projected onto said light-responsive device during adjacent exposure intervals, the improvement comprising:
  (a) control means for providing a signal;
  (b) electrical addressing means associated with said light-responsive device and responsive to said signal for extracting from said light-responsive device information-bearing electrical signals corresponding to said charge patterns at a speed which is at least as great as the speed at which said charge patterns are formed;
  (c) electronic shutter control means having (1) a first state for blocking transmittal of said electrical signals, and (2) a second state for transmitting a one of said electrical signals;
  (d) actuatable means for switching said control means from its state into its second state;
  (e) a signal storage device for receiving and storing in real time at a first data rate representations corresponding to said transmitted electrical signal;
  (f) means for retrieving said representations from said signal storage device at a second data rate that is substantially less than said first rate; and
  (g) recording apparatus for recording said representations on a non-volatile recording medium, said recording apparatus having a recording speed that is suitable for recording said representations at the rate at which said representations are retrieved from said signal storage device.

6. An electronic still camera as set forth in claim 5 including means for automatically switching said control means from said second state back to said first state following transmittal of said information-bearing electrical signal.

7. In an electronic still camera having a solid-state light-responsive imaging device located to receive optical images, the improvement comprising:
  (a) electrical addressing means associated with said imaging device for producing families of electrical signals derived from optical images formed on said imaging device during adjacent exposure intervals, each signal within a family corresponding to an optical image formed during one exposure interval and said signals being produced at a first rate which is at least as great as the rate at which said optical images are formed;
  (b) electrical gating means having (1) a first state for blocking transmittal of said electrical signals, and (2) a second state for transmitting said electrical signals;
  (c) switching means synchronized with said electrical addressing means for switching said electrical gating means from said first state into said second state then back to said first state for transmitting a given one of said electrical signals;
  (d) means for temporarily storing representations of said transmitted electrical signal in real time and for retransmitting said representations at a second rate that is substantially less than said first rate; and
  (e) recording apparatus for recording said representations on a non-volatile recording medium, said recording apparatus having a signal access speed that is compatible with the second rate at which said representations are retransmitted.

8. In an electronic still camera including a charge coupled device defining an array of light-sensitive elements located at an exposure plane, the improvement comprising:
  (a) electrical addressing means associated with said light-sensitive elements for producing families of pulsed electrical signals relating to optical images projected onto said elements during contiguous exposure intervals, said signals being produced at a rate which is at least as great as the rate at which said optical images are formed;
  (b) an electrical gating means having (1) a first state for blocking transmittal of said pulsed electrical signals, and (2) a second state for transmitting said electrical signals;

(c) actuatable switching means for switching said gating means from said first state into said second state;

(d) said electrical gating means including means for automatically switching said gating means from said second state back to said first state following transmittal of the first one of said electrical signals which occurs after actuation of said switching means;

(e) a digital data storage device;

(f) converter means for converting in real time said pulses in said first one of said electrical signals into a multi-bit digital word;

(g) means for transferring said digital words in real time into said digital data storage device;

(h) means for retrieving said digital words from said data storage device at a rate that is more than an order of magnitude less than the rate at which said words are transferred into said storage device; and (i) recording apparatus coupled to said digital words retrieving means for recording said digital words on a magnetic recording medium, said recording apparatus having a recording speed that is compatible with recording signals at an audio-grade recording rate.

* * * * *